J. C. ROSS.
FRUIT PICKER.
APPLICATION FILED AUG. 17, 1910.
1,005,476. Patented Oct. 10, 1911.
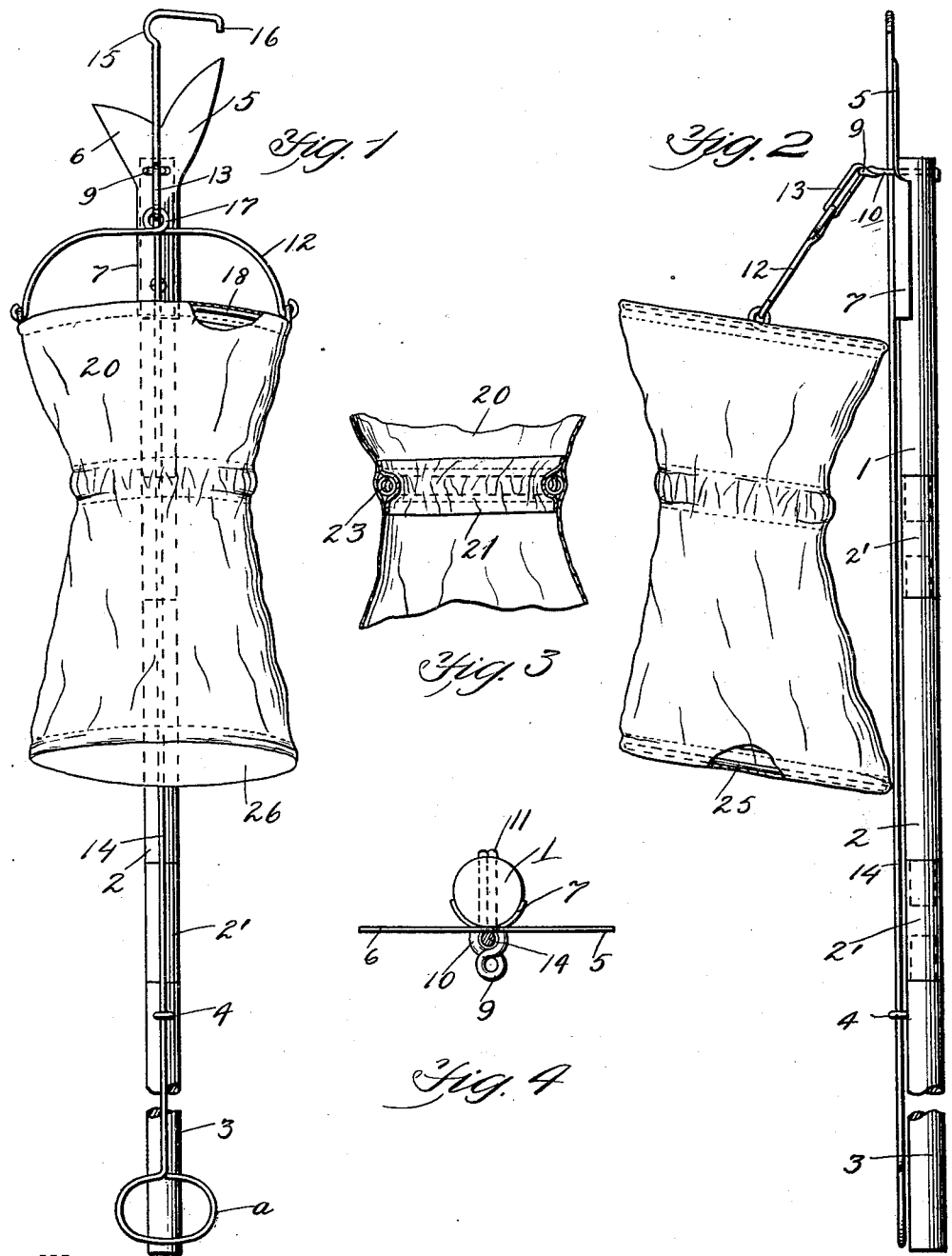
WITNESSES:
N. Abramson
A. McCarthy
INVENTOR
John C. Ross
BY Geo. W. Lues, Attorney

UNITED STATES PATENT OFFICE.

JOHN C. ROSS, OF GOLDBURG, IDAHO.

FRUIT-PICKER.

1,005,476.          Specification of Letters Patent.     Patented Oct. 10, 1911.

Application filed August 17, 1910. Serial No. 577,569.

*To all whom it may concern:*

Be it known that I, JOHN C. ROSS, a citizen of the United States, and resident of Goldburg, in the county of Custer and State of Idaho, have invented certain new and useful Improvements in Fruit-Pickers, of which the following is a specification, reference being had to the accompanying drawings.

This invention relates to improvements in fruit pickers.

The primary object of my invention is to provide a light, neat, simply constructed fruit picker for gathering fruit from the trees.

Another object is to provide a fruit picker with a duplex knife and a reversible, detaching crook, so that the fruit stems can enter the forked or V shaped knife below or above the attaching crook.

A further object is to provide a fruit picker with a receiving bag, having an elastic choking or contracting member, so that the fruit as it is severed and drops into the gathering bag, must first expand the bag before it can finally enter the same.

With these and other objects in view, the present invention consists in the combination and arrangement of parts, as will be hereinafter more fully described and particularly pointed out in the appended claim, it being understood that changes in the specific structure shown and described may be made within the scope of the claim, without departing from the spirit of the invention.

In the drawings forming a part of this specification, and in which like numerals of reference indicate similar parts in the several views:—Figure 1, shows a front, elevational view of a fruit picker embodying my invention, with portions broken away. Fig. 2, shows a side, elevational view with portions broken away. Fig. 3, shows a fragmentary, sectional view disclosing the position of the choking or contracting element. Fig. 4, shows an enlarged top view, disclosing the arrangement of the duplex eye bolt and a V shaped knife.

The aim of my invention is to provide a readily operated fruit picker, so constructed that the detaching member can be reversed, permitting the fruit stems to enter the knife slot from above or below.

In the drawings, the numerals 1, 2 and 3, designate the sectional supporting staff, which can be of any suitable length. The staff sections are provided with the ferrule 2′, so that they can be readily attached or connected. Secured to the uppermost staff section 1, is a V shaped knife having the two upstanding blades 5 and 6, the blade 5 extending upward a greater distance and being longer than the blade section 6. The knife is provided with the attaching tang 7, having apertures, so that the knife may be securely fastened by means of screws or bolts to the upper end of staff section 1.

In securing the V shaped knife to the upper staff end I employ a duplex eye bolt, having an inner eye 10, and an outer eye 9, the stems 11 of these duplex eye bolts being carried through suitable openings within the V shaped knife and through openings within the staff 1, so that the ends 11 may be properly clenched in securely holding the knife to the staff.

At the lower end the staff is provided with a guiding eye bolt 4 as shown in Figs. 1 and 2. In making the knife V shaped two very important advantages are gained, in that the blade members 5 and 6 serve as a guide to the crook used in connection therewith, as well as serving to cut the fruit stem. Revolubly and slidably mounted within the inner eye bolt 10 and the lower eye bolt 4, is the operating stem 14, having at its lower end the hand loop *a*, while at its upper end this operating stem ends in a detaching crook 15, which is provided with the bent end 16. This crook is arranged to rub upon the front of the blade portions 5 and 6. In Fig. 1, the crook is shown as turned so as to come into sliding contact with the front of the blade member 5. However, as this operating stem 14 is revolubly held within the eye bolts, the crook can be reversed so as to come into sliding contact with the blade portion, 6, so that the fruit stem, the fruit being detached, may be made to enter below or above the crook so that in one instance the blade 5 will detach the fruit and in the other the blade 6. From the foregoing it will be seen that I provide a knife having two divergently held blades the cutting edges of which form a crotch and that the crook 16, slides upon the outer face of these blades and in one position coöperates with the blade 5, and in the reverse position with the blade 6.

In detaching the staff the sections are uncoupled or taken apart and the eye bolts can then be easily moved from the operating stem 14. As the operating members 14 are extremely simple in construction and cheaply made, two or more of these operating members of various lengths can be used in connection with a staff having a plurality of sections. Detachably engaging the outer eye 9, is a link 13, which is snapped into the eye 17, of the bail 12, which is put into the wire rim 18, giving support to the fabric bag 20, which at its lower end has a wire frame 25, giving support to the fabric bottom 26. This bag centrally is restricted by the band 21, between which band and the bag is held a contracting member 23, in the form of a coil spring or elastic band, forming a choke opening, which must be distended before the fruit can enter the bag properly. The bag, it is of course understood, is detachably secured to the staff so that when filled same can be readily removed.

A fruit picker constructed according to my invention is simple and inexpensive and both durable and efficient in operation, and the crook can be reversed by rotating the stem 14 and operated with ease, accuracy and despatch when detaching the desired fruit.

Having thus described my said invention, what I claim as new and desire to secure by United States Letters Patent is:—

In combination, a staff, a knife having a tang and two divergent integral blades the cutting edges of which form a crotch, a duplex eye bolt including an inner and an outer eye securing said knife to said staff, a sliding operating rod revolubly held within said inner eye ending in a crook arranged for co-action with the cutting edge of either of said blades, and a bag supported by said outer eye.

In testimony whereof I affix my signature, in presence of two witnesses.

JOHN C. ROSS.

Witnesses:
  GEO. E. KEYES,
  D. W. SHANAFELT.

---

Copies of this patent may be obtained for five cents each, by addressing the "Commissioner of Patents, Washington, D. C."